Figure 1:
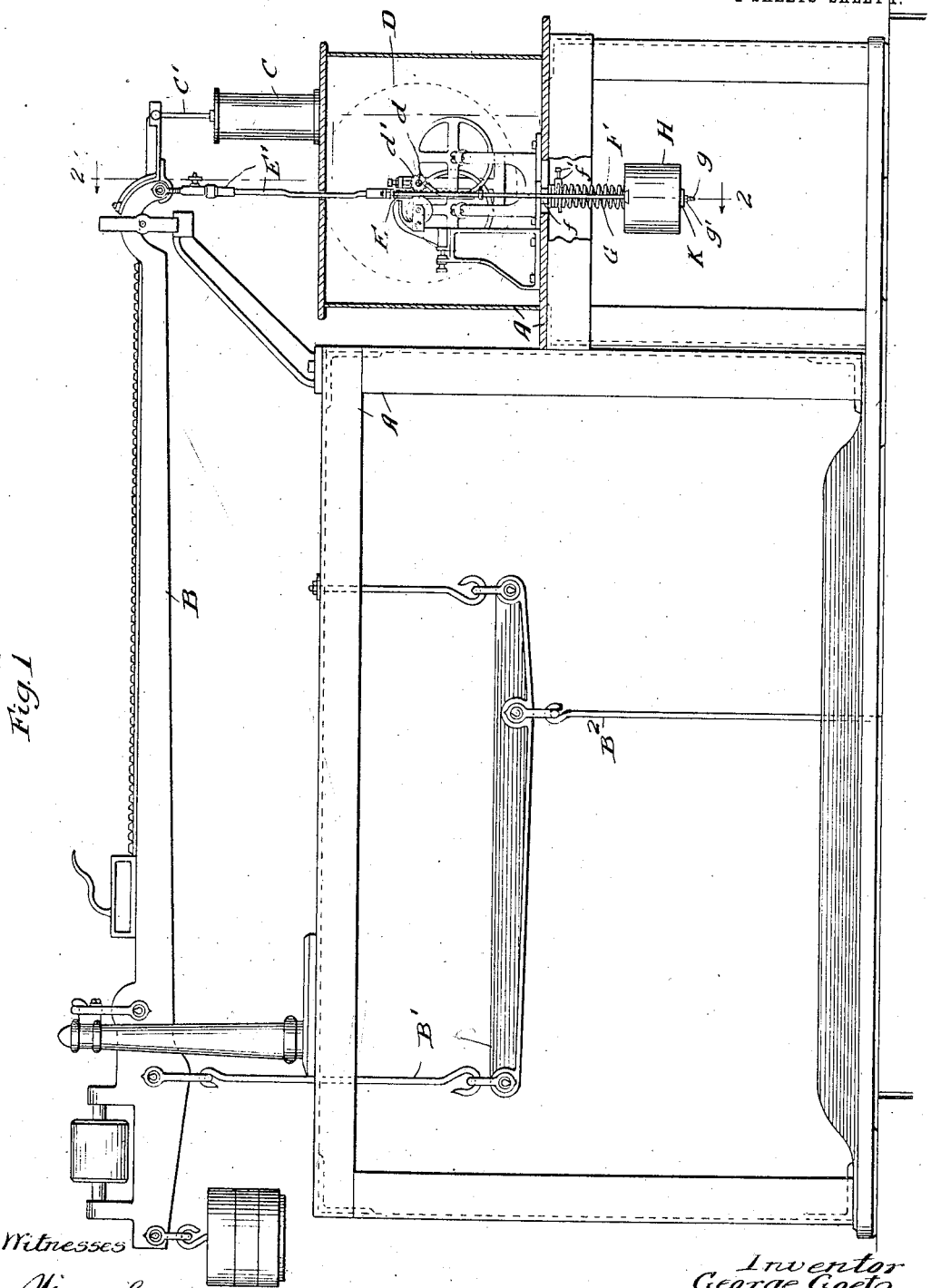

G. GOETZ.
SCALE FOR WEIGHING AND RECORDING WEIGHTS OF CARS.
APPLICATION FILED MAY 27, 1909.

1,032,667.

Patented July 16, 1912.

2 SHEETS—SHEET 1.

Witnesses
Wm. Geiger
H. W. Munday.

Inventor
George Goetz
H. Y. Munday, Evarts, Adcock & Clarke.
Attorneys

G. GOETZ.
SCALE FOR WEIGHING AND RECORDING WEIGHTS OF CARS.
APPLICATION FILED MAY 27, 1909.
1,032,667.
Patented July 16, 1912.
2 SHEETS—SHEET 2.
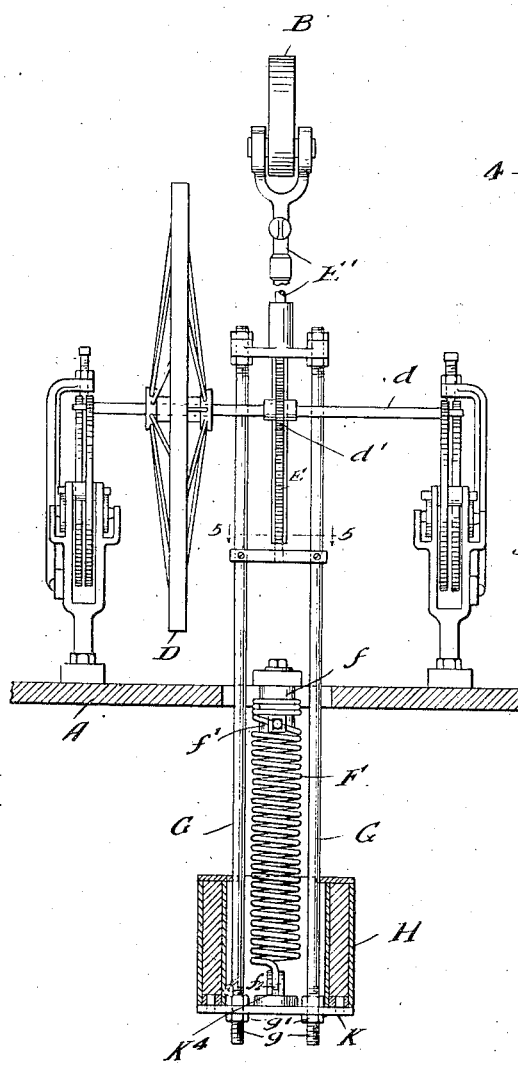
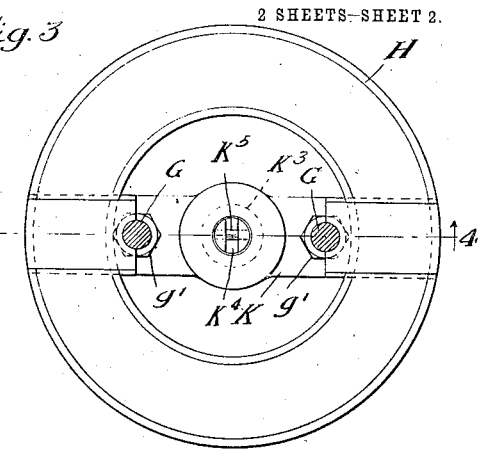
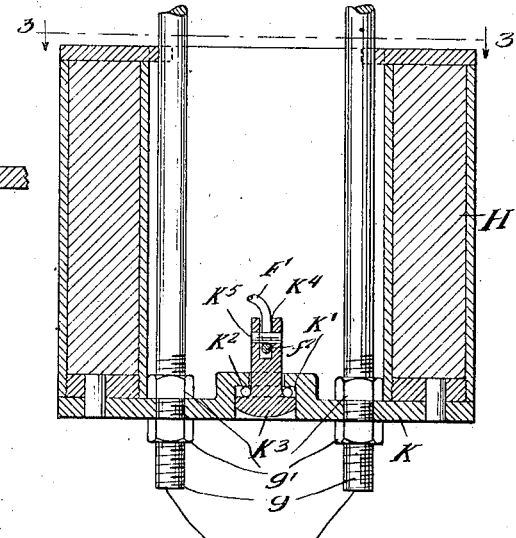
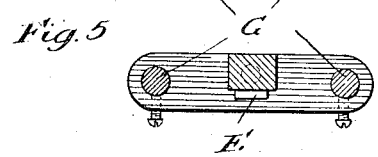
Witnesses:
Inventor:
George Goetz
By Munday, Evarts, Adcock & Clarke,
Attorneys

UNITED STATES PATENT OFFICE.

GEORGE GOETZ, OF CHICAGO, ILLINOIS, ASSIGNOR TO STREETER-AMET WEIGHING & RECORDING COMPANY, OF CHICAGO, ILLINOIS, A CORPORATION OF ILLINOIS.

SCALE FOR WEIGHING AND RECORDING WEIGHTS OF CARS.

1,032,667.   Specification of Letters Patent.   Patented July 16, 1912.

Application filed May 27, 1909. Serial No. 498,778.

*To all whom it may concern:*

Be it known that I, GEORGE GOETZ, a citizen of the United States, residing in Chicago, in the county of Cook and State of Illinois, have invented a new and useful Improvement in Scales for Weighing and Recording Weights of Cars, of which the following is a specification.

My invention relates to scales for automatically weighing and recording weights of cars, and more particularly to improvements upon the automatic weighing and recording car scales of my Patents Nos. 651,845, 778,358, and 778,359.

In the weighing and recording car scales of my said prior patents, the scale beam is connected with a counterbalance spring through a rack bar, the teeth of which mesh with a gear on the printing wheel shaft and thus turns the printing wheel to the position for recording the true weight of the car on the scale platform; and heretofore in practical operation, very slight changes in temperature by expansion or contraction of the spring cause substantial inaccuracies in the operation of the weighing and recording mechanism, as a very slight or infinitesimal movement of the rack bar represents a variation in weight of the car of many pounds. And as a consequence, for accurate weighing, the connection between the counterbalance spring and rack-bar requires frequent adjustment to compensate for changes of temperature during the day as well as for different seasons of the year.

The object of my invention is to provide a simple, efficient and reliable means for obviating this defect in operation. This object or result I accomplish, and herein my invention consists, by coöperatively combining with the scale beam, printing wheel, rack and gear, a compensating weight, operating to hold the counterbalance spring extended under an initial tension or load, and a compensating connection between the counterbalance weight on the lower end of the counterbalance spring and the scale beam or rack, the compensating connection being constructed and adapted to elongate or contract in length under variations in temperature to the same extent that the coiled counterbalance spring extends or contracts in length under like variations. Any temperature contractions or expansions of the one will be thus compensated for by corresponding temperature expansions or contractions of the other through the coöperative action of the compensating weight, as any temperature elongation of the spring for example, which lowers the weight, correspondingly elongates the compensating connection between the weight and the rack, so that the rack thus remains normally in the same position under a temperature rise; and the operation is precisely the same but the reverse when a temperature contraction of the counterbalance spring and compensating connection takes place.

My invention also consists in the novel construction of parts and devices and in the novel combinations of parts and devices herein shown and described and more particularly specified in the claims.

In the accompanying drawing forming a part of this specification, I have shown only those portions of my car weighing and recording scale to which my present improvements particularly relate, and I would refer to the specification and drawings of my said prior patents for a full description of the construction and operation of the other portions of the apparatus, such other portions being preferably constructed substantially in accordance with the specification and drawings of one or the other of my said prior patents.

In said drawing, Figure 1 is a side elevation partly in vertical section of a weighing and recording car scale embodying my invention, showing, however, only that portion of the complete apparatus to which my invention relates. Fig. 2 is a front elevation, partly in vertical section on line 2—2 of Fig. 1. Fig. 3 is a detail horizontal section on line 3—3 of Fig. 4. Fig. 4 is a detail vertical section on line 4—4 of Fig. 3. Fig. 5 is a detail horizontal section on line 5—5 of Fig. 2.

In the drawing, A represents the frame of the weighing and recording car scale, B the scale beam connected with the scale platform through customary connecting links and levers B¹ B². C is the dash-pot, the piston stem C¹ of which is connected with the scale beam. D is the printing or recording wheel, the shaft $d$ of which is furnished with a gear $d^1$ which meshes with the rack E having connections E¹ with the scale beam. F is the counterbalance spring having a connection $f$ at one end with the stationary frame A, and provided with an adjusting device $f^1$ for cutting out or forcing solid one or more coils of the spring to vary its length as may be required. All these parts are or may be of any suitable construction and need no further description, being preferably constructed and operating substantially in accordance with one or the other of my said prior patents.

G is the compensating connection and H the compensating weight, the compensating weight being on the lower end of the counterbalance spring and operating to hold or maintain it normally extended under an initial load or tension of say sixteen pounds or substantially the same as that representing the upward pull of the scale beam when weighing the maximum load or capacity which the car scale is intended to weigh. The compensating connection G between the weight and lower end of the spring and the rack E preferably consists of a pair of aluminum rods, and their length is such that they vary in length under changes of temperature to substantially the same or equal extent that the counterbalance spring F varies in length under like variations of temperature. The compensating connection G I preferably make of aluminum, as this metal expands and contracts under variations in temperature to a greater degree than most other metals, and I am thus enabled to make these connecting rods shorter than would otherwise be necessary; it being of course understood that the counterbalance spring, because of its coils, is a rod of very much greater length than the length of the spring. The spring, however, expanding or contracting under variations of temperature of course varies in diameter as well as in length, so that the spring's contraction or expansion in diameter materially diminishes the variation in length that would otherwise occur.

To prevent the spring, in expanding or contracting under variations in temperature from exerting a torsional strain, I provide the connection of its lower end with the weight H and compensating connection G with a ball bearing so that the spring can easily turn without binding. The connecting plate K has a ball bearing socket or race $K^1$ furnished with balls $K^2$ and a rotatable coupling head $K^3$ having a slot $K^4$ and pin $K^5$ for engagement with hook $f^2$ at the lower end of the spring, thus affording a simple and efficient ball bearing connection between the counterbalance spring F and the compensating connection G and compensating weight H. The compensating connection or rods G are furnished with screw threads $g$ at their lower ends and with adjusting nuts $g^1$.

I claim:—

1. The combination with a scale beam and counterbalance spring, of a compensating weight holding the spring under an initial tension, and a compensating device coöperating therewith to neutralize variations in temperature, a recording wheel and a rack and gear for operating said weight recording wheel from said scale beam, said compensating device being connected to said rack through the compensating weight, substantially as specified.

2. The combination with a scale beam and counterbalance spring, of a compensating weight holding the spring under an initial tension and a compensating device coöperating therewith to neutralize variations in temperature, a rack, a gear meshing therewith and a weight recording wheel, said counterbalance spring and weight having a ball bearing connection between them, said compensating device being between said rack and weight, substantially as specified.

3. The combination with a scale beam and counterbalance spring, of a compensating weight holding the spring under an initial tension and a compensating device coöperating therewith to neutralize variations in temperature, a rack, a gear meshing therewith and a weight recording wheel rotated thereby, said counterbalance spring and weight having a ball bearing connection between them, and said compensating device being between said rack and weight, substantially as specified.

4. The combination with a scale beam, a rack connected thereto, a counterbalance spring, a compensating weight holding the spring under an initial tension and a compensating connection between the weight and rack, substantially as specified.

5. The combination with a scale beam, a rack connected thereto, a counterbalance spring, a compensating weight holding the spring under an initial tension and a compensating connection between the weight and rack, a gear meshing with said rack and a printing wheel actuated thereby, substantially as specified.

6. The combination with a scale beam, a rack connected thereto, a counterbalance spring, a compensating weight holding the spring under an initial tension and a compensating connection between the weight and rack, a gear meshing with said rack and a printing wheel actuated thereby, and a ball bearing connection interposed between the lower end of the spring and the weight, substantially as specified.

7. The combination with a scale beam, a rack connected thereto, a counterbalance spring, a compensating weight holding the spring under an initial tension and a compensating connection between the weight and rack, and a connecting plate adjustably secured to said compensating connection, substantially as specified.

8. The combination with a scale beam, a rack connected thereto, a counterbalance spring, a compensating weight holding the spring under an initial tension, and a compensating connection between the weight and rack, a connecting plate adjustably secured to said compensating connection, and a ball bearing between the lower end of the spring and said connecting plate, substantially as specified.

GEORGE GOETZ.

Witnesses:
PEARL ABRAMS,
H. M. MUNDAY.